US011837752B2

(12) United States Patent
Ichikawa

(10) Patent No.: US 11,837,752 B2
(45) Date of Patent: Dec. 5, 2023

(54) BATTERY INCLUDING RESTRICTING STRUCTURE

(71) Applicant: AESC Japan Ltd., Zama (JP)

(72) Inventor: Tomoyuki Ichikawa, Sagamihara (JP)

(73) Assignee: AESC Japan Ltd., Zama (JP)

( * ) Notice: Subject to any disclaimer, the term of this patent is extended or adjusted under 35 U.S.C. 154(b) by 67 days.

(21) Appl. No.: 16/757,145

(22) PCT Filed: Oct. 19, 2017

(86) PCT No.: PCT/JP2017/037781
§ 371 (c)(1),
(2) Date: Apr. 17, 2020

(87) PCT Pub. No.: WO2019/077713
PCT Pub. Date: Apr. 25, 2019

(65) Prior Publication Data
US 2021/0376426 A1 Dec. 2, 2021

(51) Int. Cl.
*H01M 50/474* (2021.01)
*H01M 50/54* (2021.01)
(Continued)

(52) U.S. Cl.
CPC ..... *H01M 50/474* (2021.01); *H01M 10/0585* (2013.01); *H01M 50/105* (2021.01);
(Continued)

(58) Field of Classification Search
CPC ............. H01M 10/0585; H01M 10/54; H01M 50/474; H01M 50/54
See application file for complete search history.

(56) References Cited

U.S. PATENT DOCUMENTS

2009/0111010 A1* 4/2009 Okada ............... H01M 10/6563
429/120
2011/0136002 A1* 6/2011 Cho .................. H01M 10/0587
429/186
(Continued)

FOREIGN PATENT DOCUMENTS

CN 106450072 A 2/2017
EP 2437330 A1 4/2012
(Continued)

OTHER PUBLICATIONS

Partial Supplementary European Search Report dated Jun. 7, 2021 from the European Patent Office in EP application No. 17928858.4.
(Continued)

*Primary Examiner* — Jimmy Vo
(74) *Attorney, Agent, or Firm* — Sughrue Mion, PLLC

(57) ABSTRACT

In an initial state, a battery is in the following state. A laminate has a thickness $T_0$ from a first electrode to a first electrode. A first position is spaced from the end portion of a separator on the first position side by a distance $L_0$ in a direction perpendicular to a thickness direction of the laminate. The end portion of a separator on the first position side protrudes toward the first position from the end portion of the second electrode on the first position side, by a distance G in the direction perpendicular to the thickness direction of the laminate. The laminate is designed such that, even if the laminate swells in the thickness direction of the laminate, the thickness of the laminate from the first electrode to the first electrode is smaller than $4 \times \{(T_0/2)^2 + L_0^2 - (L_0-G)^2\}^{1/2}$.

5 Claims, 8 Drawing Sheets

(51) Int. Cl.
    *H01M 10/0585*     (2010.01)
    *H01M 50/531*     (2021.01)
    *H01M 50/105*     (2021.01)
    *H01M 50/291*     (2021.01)
    *H01M 50/264*     (2021.01)
    *H01M 50/211*     (2021.01)
    *H01M 10/0525*     (2010.01)

(52) U.S. Cl.
    CPC ....... *H01M 50/211* (2021.01); *H01M 50/264* (2021.01); *H01M 50/291* (2021.01); *H01M 50/531* (2021.01); *H01M 50/54* (2021.01); *H01M 10/0525* (2013.01)

(56) References Cited

U.S. PATENT DOCUMENTS

2016/0268643 A1\*   9/2016   Mack ................... H01M 50/209
2017/0047562 A1     2/2017   Ogawa et al.
2017/0309871 A1\*   10/2017   Jo ..................... H01M 10/0585

FOREIGN PATENT DOCUMENTS

| | | |
|---|---|---|
| JP | 2002-117904 A | 4/2002 |
| JP | 2002-198098 A | 7/2002 |
| JP | 2004-14125 A | 1/2004 |
| JP | 2011-081925 A | 4/2011 |
| JP | 2013-025999 A | 2/2013 |
| JP | 2014-157722 A | 8/2014 |
| JP | 2015-159086 A | 9/2015 |
| JP | 2016-54108 A | 4/2016 |
| JP | 2017-037789 A | 2/2017 |
| WO | 2008/007767 A1 | 1/2008 |
| WO | 2014/002950 A1 | 1/2014 |
| WO | 2016/137141 A1 | 9/2016 |
| WO | 2016/152037 A1 | 9/2016 |
| WO | 2017/163696 A1 | 9/2017 |

OTHER PUBLICATIONS

International Search Report for PCT/JP2017/037781, dated Dec. 19, 2017.

\* cited by examiner

BATTERY INCLUDING RESTRICTING STRUCTURE

CROSS REFERENCE TO RELATED APPLICATIONS

This application is a National Stage of International Application No. PCT/JP2017/037781 filed Oct. 19, 2017.

TECHNICAL FIELD

The present invention relates to a battery.

BACKGROUND ART

In recent years, non-aqueous electrolyte secondary batteries, in particular, lithium ion secondary batteries have been developed. The non-aqueous electrolyte secondary battery has a laminate including a plurality of positive electrodes, a plurality of negative electrodes, and a plurality of separators. The plurality of positive electrodes and the plurality of negative electrodes are alternately stacked, and the plurality of separators separate the positive electrodes and the negative electrodes from each other.

The laminate may swell under specific conditions. Patent Document 1 discloses that the laminate swells in overcharge. Patent Document 1 discloses that pressure is applied between the positive electrode and the negative electrode in overcharge in order to suppress swelling of the laminate.

RELATED DOCUMENT

Patent Document

[Patent Document 1] Japanese Unexamined Patent Publication No. 2002-117904

SUMMARY OF THE INVENTION

Technical Problem

The present inventor has found that the positive electrode and the negative electrode have a possibility of being short-circuited to each other by expanding the laminate. The present inventors have studied conditions for preventing the occurrence of the short circuit between the short circuit and the positive electrode even if the laminate swells.

An object of the present invention is to suppress the possibility of a short circuit between the positive electrode and the negative electrode even if the laminate swells. Other objects of the present invention are clear from the following description of embodiments.

Solution to Problem

According to an aspect of the present invention, there is provided a battery including:
a laminate that includes a plurality of first electrodes, a plurality of second electrodes which have polarities different from the plurality of first electrodes and are alternately arranged with the plurality of first electrodes, and a plurality of separators that respectively separate the first electrodes and the second electrodes from each other; and
a plurality of first tabs that respectively protrude from the plurality of first electrodes and are bundled together,
wherein the plurality of first electrodes includes a primary first-electrode, a secondary first-electrode, and a tertiary first-electrode,
the primary first-electrode is located between the secondary first-electrode and the tertiary first-electrode,
the first tab for the primary first-electrode, the first tab for the secondary first-electrode, and the first tab for the tertiary first-electrode are connected to each other at a first position of an equal distance from the secondary first-electrode and the tertiary first-electrode,
the plurality of second electrodes includes a primary second-electrode adjacent to the primary first-electrode,
the plurality of separators includes a first separator that separates the primary first-electrode and the primary second-electrode from each other,
in a case where the laminate does not swell in a thickness direction of the laminate,
the laminate has a thickness $T_0$ from the secondary first-electrode to the tertiary first-electrode,
the first position is spaced from an end portion of the first separator on the first position side by a distance $L_0$ in a direction perpendicular to the thickness direction of the laminate,
the end portion of the first separator on the first position side protrudes toward the first position from an end portion of the primary second-electrode on the first position side, by a distance G in the direction perpendicular to the thickness direction of the laminate, and
the laminate is designed such that, even if the laminate swells in the thickness direction of the laminate, a thickness of the laminate from the secondary first-electrode to the tertiary first-electrode is smaller than $4\times\{(T_0/2)^2+L_0^2-(L_0-G)^2\}^{1/2}$.

According to another aspect of the present invention, there is provided a battery including:
a plurality of laminates, each including a plurality of first electrodes, a plurality of second electrodes, and a plurality of separators;
a plurality of exterior materials that respectively accommodate the plurality of the laminates and are stacked together;
a plurality of spacers that separate the adjacent exterior materials from each other; and
a member that integrally fixes the plurality of the laminates and the plurality of spacers,
wherein the plurality of exterior materials includes a first exterior material, a second exterior material, and a third exterior material in order,
the plurality of spacers includes a first spacer that separates the first exterior material and the second exterior material from each other and a second spacer that separates the second exterior material and the third exterior material from each other,
the first spacer includes a first portion overlapping the first exterior material and the second exterior material and a second portion protruding toward the second spacer from the first portion of the first spacer,
the second spacer includes a first portion overlapping the second exterior material and the third exterior material and a second portion protruding toward the first spacer from the first portion of the second spacer, and
the second portion of the first spacer and the second portion of the second spacer face each other.

Advantageous Effects of Invention

According to the above aspect of the present invention, it is possible to reduce a possibility of a short circuit between the positive electrode and the negative electrode even if the laminate swells.

BRIEF DESCRIPTION OF THE DRAWINGS

The above-described object and other objects, features, and advantages will be further clarified by the preferred embodiments described below and the following drawings attached thereto.

DESCRIPTION OF EMBODIMENTS

Figure 1:
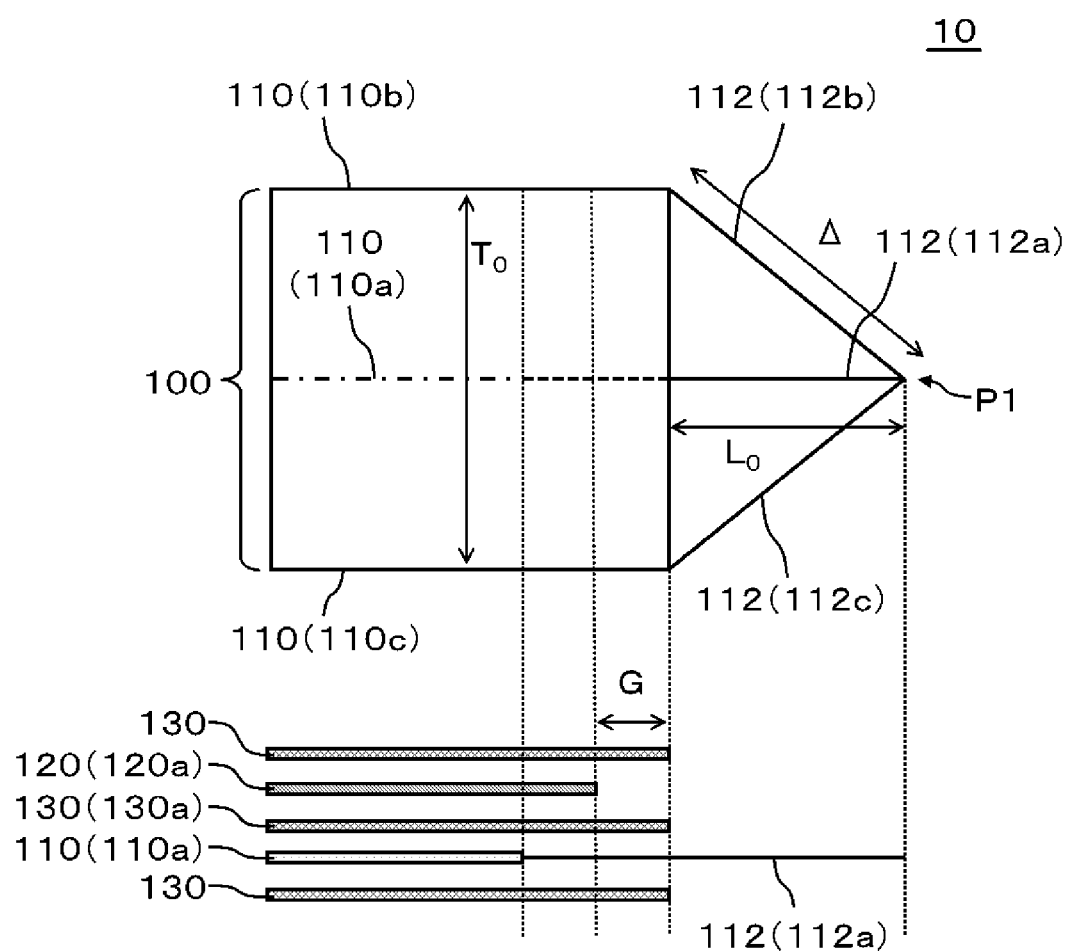
FIG. 1 is a diagram illustrating a battery according to an embodiment.

Hereinafter, embodiments of the present invention will be described with reference to the drawings. In all the drawings, the similar components are denoted by the similar reference numerals, and description thereof will not be repeated.

Figure 2:
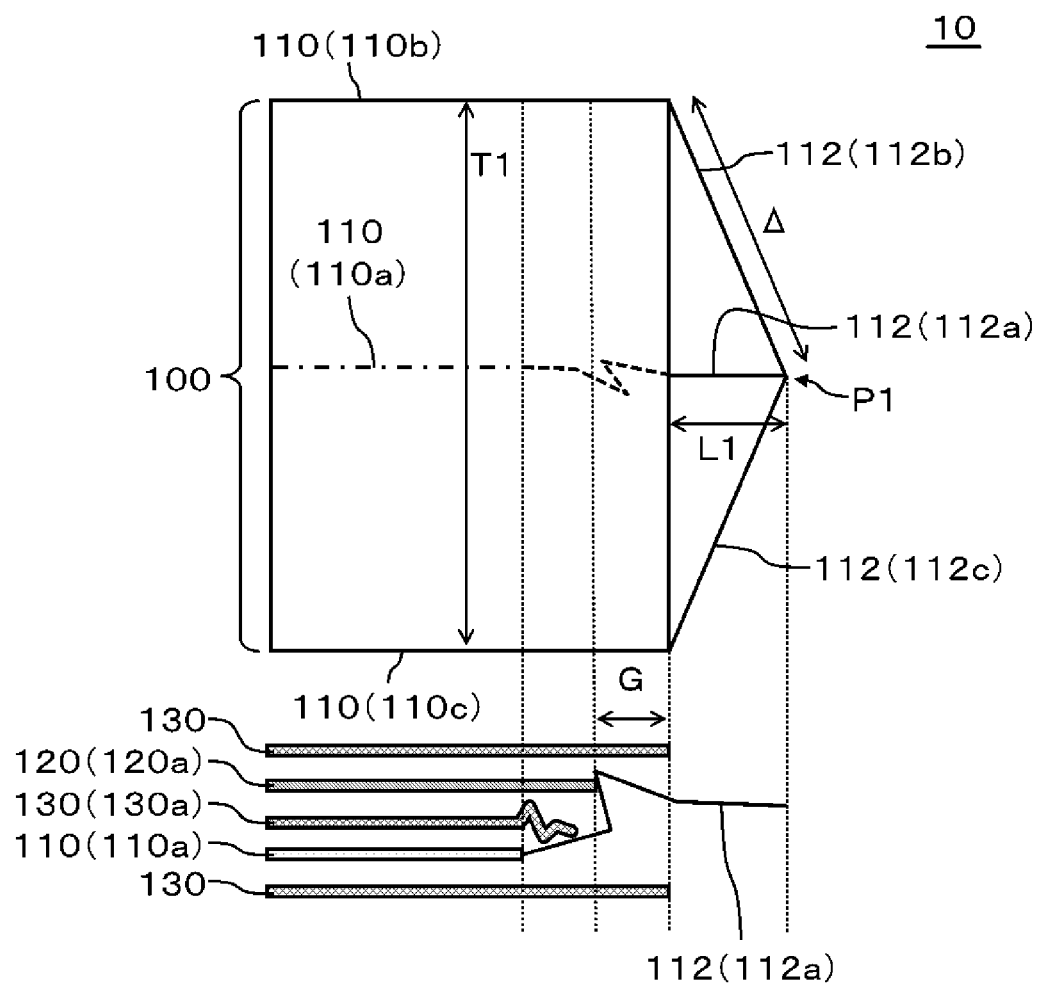
FIG. 2 is a diagram illustrating the battery according to the embodiment.

FIGS. 1 and 2 are diagrams illustrating a battery 10 according to an embodiment. The upper figures of FIGS. 1 and 2 are side views of the battery 10, and the lower figures of FIGS. 1 and 2 are diagrams specifically illustrate a first electrode 110a and the peripheral thereof in the battery 10.

The battery 10 will be described with reference to FIG. 1. The battery 10 includes a laminate 100 and a plurality of first tabs 112. The laminate 100 includes a plurality of first electrodes 110, a plurality of second electrodes 120, and a plurality of separators 130. The plurality of second electrodes 120 have different polarities from the plurality of first electrodes 110, respectively. The plurality of second electrodes 120 are alternately arranged with the plurality of first electrodes 110. The plurality of separators 130 separate the first electrodes 110 and the second electrodes 120 from each other. The plurality of first tabs 112 respectively protrude from the plurality of first electrodes 110 and are bundled together.

In the embodiment, the first electrode 110 is a positive electrode, and the second electrode 120 is a negative electrode. In the example illustrated in FIG. 1, the length of the second electrode 120 is longer than the length of the first electrode 110. The end portion of the second electrode 120 on a first position P1 side is located closer to the first position P1 than the end portion of the first electrode 110 on the first position P1 side. In particular, when the battery 10 is a lithium-ion secondary battery, the length of the negative electrode (second electrode 120) is longer than the length of the positive electrode (first electrode 110). That is, the area of the negative electrode (second electrode 120) is larger than the area of the positive electrode (first electrode 110). Thus, the negative electrode efficiently receives lithium ions from the positive electrode.

In another example, the first electrode 110 and the second electrode 120 may be a negative electrode and a positive electrode, respectively. As is clear from the description of the embodiment, the configuration according to the embodiment is not limited to an example in which the first electrode 110 and the second electrode 120 are a positive electrode and a negative electrode, respectively. The configuration in the embodiment may be applied to an example in which the first electrode 110 and the second electrode 120 are a negative electrode and a positive electrode, respectively.

The plurality of first electrodes 110 include a first electrode 110a (primary first-electrode), a first electrode 110b (secondary first-electrode), and a first electrode 110c (tertiary first-electrode). The first electrode 110a is located between the first electrode 110b and the first electrode 110c. In the example illustrated in FIGS. 1 and 2, the first electrode 110b and the first electrode 110c are respectively located at one end and the other end of both ends of the plurality of first electrodes 110.

The first tab 112 (first tab 112a) of the first electrode 110a, the first tab 112 (first tab 112b) of the first electrode 110b, and the first tab 112 (first tab 112c) of the first electrode 110c are connected to each other at the first position P1. The first position P1 is of an equal distance from the first electrode 110b and the first electrode 110c.

The plurality of second electrodes 120 include a second electrode 120a (primary second electrode). The second electrode 120a is adjacent to the first electrode 110a.

The plurality of separators 130 include a separator 130a (first separator). The separator 130a separates the first electrode 110a and the second electrode 120a from each other.

In FIG. 1, the laminate 100 is in an initial state. In the initial state, the laminate 100 does not swell in the thickness direction of the laminate 100. In an example, if the battery is not charged or discharged, the laminate 100 is not heated or cooled, and, when the battery is at a temperature of 25° C., the laminate 100 does not swell in the thickness direction of the laminate 100.

As illustrated in FIG. 1, in the initial state, the battery 10 is in the following state. The laminate 100 has a thickness $T_0$ from the first electrode 110b to the first electrode 110c. The first position P1 is spaced from the end portion of the separator 130a on the first position P1 side by a distance $L_0$ in a direction perpendicular to the thickness direction of the laminate 100. The end portion of the separator 130a on the first position P1 side protrudes toward the first position P1 from the end portion of the second electrode 120a on the first position P1 side, by a distance G in a direction perpendicular to the thickness direction of the laminate 100.

The laminate 100 is designed such that, even if the laminate 100 swells in the thickness direction of the laminate 100, the thickness of the laminate 100 from the first electrode 110b to the first electrode 110c is smaller than $2\times\{(T_0/2)^2+L_0^2-(L_0-G)^2\}^{1/2}$.

The present inventor has found the followings. If the thickness of the laminate 100 from the first electrode 110b to the first electrode 110c is suppressed to be within the above-described range, a possibility of a short circuit between the first electrode 110 and the second electrode 120, in particular, between the first electrode 110a and the second electrode 120a (that is, the first electrode 110a and the second electrode 120a located at the substantially center of the laminate 100) is reduced.

With reference to FIG. 2, the reason why the possibility of a short circuit between the first electrode 110a and the second electrode 120a is reduced by suppressing the thickness of the laminate 100 to be in the above-described range will be described.

The laminate 100 swells from a thickness $T_0$ (FIG. 1) to a thickness $T_1$ (FIG. 2). The laminate 100 swells under specific conditions, for example, overcharging of the laminate 100 or heating of the laminate 100.

The following expression (1) is established based on Pythagorean theorem.

$$\Delta^2 = L_0^2 + (T_0/2)^2 = L_1^2 + (T_1/2)^2 \quad (1)$$

Specifically, the distance between the end portion of the first electrode 110b and the first position P1 is constant ($\Delta$ in FIGS. 1 and 2) in both the initial state of the laminate 100 (FIG. 1) and a state where the laminate 100 has swelled (FIG. 2). On the other hand, the first position P1 moves in a direction toward the laminate 100, by tension between the first position P1 and the first electrode 110b and tension between the first position P1 and the first electrode 110c. Thus, a distance between the first position P1 and the laminate 100 decreases from $L_0$ (FIG. 1) to $L_1$ (FIG. 2) ($L_0 > L_1$).

The condition for reducing the possibility of contact between the first tab 112a of the first electrode 110a and the second electrode 120a may be as represented by the following expression (2).

$$L_0 - L_1 < G \quad (2)$$

Specifically, if the first position P1 moves in the direction toward the laminate 100, the first tab 112a of the first electrode 110a is bent and comes into contact with the second electrode 120a as illustrated in FIG. 2. The possibility between the first tab 112a and the second electrode 120a may increase as a moving distance (that is, $L_0 - L_1$) of the first position P1 becomes greater than the distance G. In other words, if the moving distance (that is, $L_0 - L_1$) of the first position P1 is shorter than the distance G (that is, the expression (2) is satisfied), it is possible to reduce the possibility of the contact between the first tab 112a and the second electrode 120a.

The following expression (3) is derived from the expressions (1) and (2).

$$T_1 < 2 \times \{(T_0/2)^2 + L_0^2 - (L_0 - G)^2\}^{1/2} \quad (3)$$

The expression (3) means that the possibility of a short circuit between the first electrode 110a and the second electrode 120a is reduced by suppressing the thickness of the laminate 100 from the first electrode 110b to the first electrode 110c to be smaller than $2 \times \{(T_0/2)^2 + L_0^2 - (L_0 - G)^2\}^{1/2}$.

Figure 3:
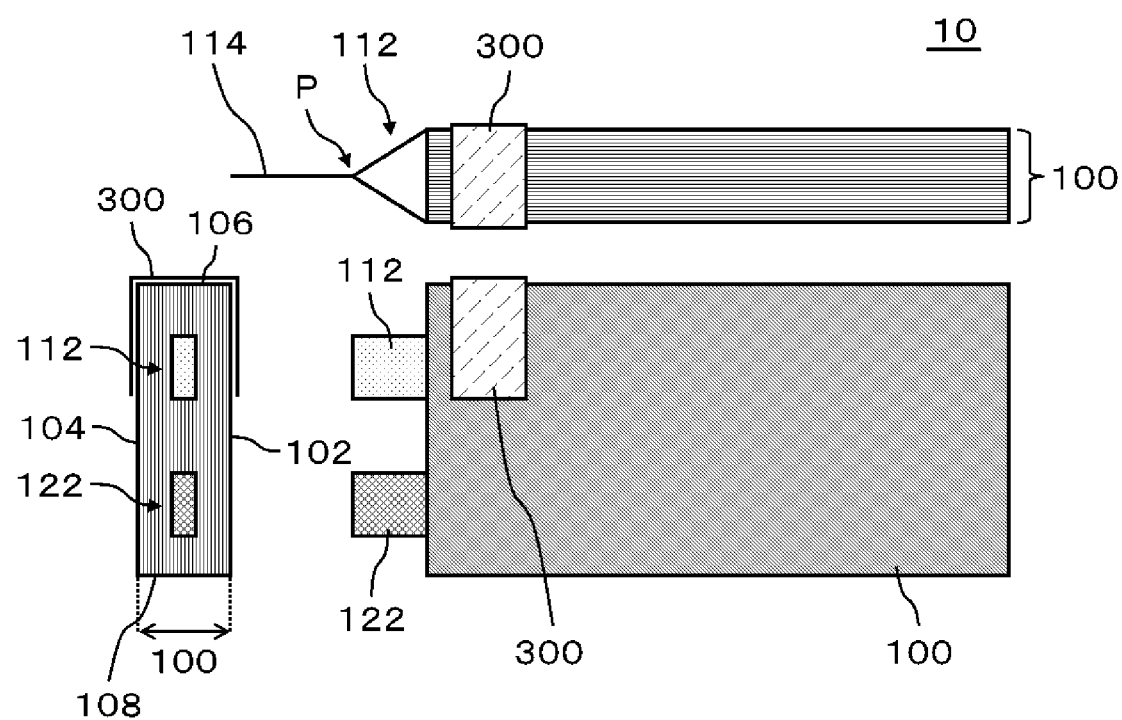
FIG. 3 is a diagram illustrating a first example of a method of restricting swelling of a laminate.

FIG. 3 is a diagram illustrating a first example of a method for restricting swelling of the laminate 100. The upper figure in FIG. 3 is a side view of the laminate 100, the lower left figure in FIG. 3 is a front view of the laminate 100, and the lower right diagram in FIG. 3 is a plan view of the laminate 100.

The battery 10 includes a plurality of first tabs 112 and a plurality of second tabs 122. As described with reference to FIG. 1, the plurality of first tabs 112 respectively protrude from plurality of first electrodes 110 (for example, FIG. 1 or 2), and are bundled together. In the example illustrated in FIG. 3, the plurality of first tabs 112 are connected to a lead 114. Similar to the plurality of first tabs 112, the plurality of second tabs 122 protrude from the plurality of second electrodes 120 (for example, FIG. 1 or 2), and are bundled together. The plurality of second tabs 122 may be connected to a lead in the same manner as that for the plurality of first tabs 112.

The laminate 100 has a first surface 102, a second surface 104, a third surface 106, and a fourth surface 108. The first surface 102 and the second surface 104 are located on sides opposite to each other in the thickness direction of the laminate 100. The third surface 106 is between the first surface 102 and the second surface 104 and is closer to the plurality of first tabs 112 than to the plurality of second tabs 122. The fourth surface 108 is between the first surface 102 and the second surface 104 and is closer to the plurality of second tabs 122 than to the plurality of first tabs 112.

The battery 10 includes a member 300. The member 300 is attached to the laminate 100. In the example illustrated in FIG. 3, the member 300 is a tape. The member 300 covers the plurality of first tabs 112 side of the laminate 100. Specifically, the member 300 covers the third surface 106, the first surface 102 in a region closer to the third surface 106 than to the fourth surface 108, and the second surface 104 in a region closer to the third surface 106 than to the fourth surface 108. The member 300 exposes the fourth surface 108, the first surface 102 in the region closer to the fourth surface 108 than to the third surface 106, and the second surface 104 in the region closer to the fourth surface 108 than to the third surface 106.

Since the member 300 covers the plurality of first tabs 112 side of the laminate 100, it is possible to restrict swelling of the plurality of first tabs 112 side of the laminate 100.

In addition, since the member 300 exposes the plurality of second tabs 122 side of the laminate 100, it is possible to reduce the member 300 attached to the laminate 100. Specifically, as described with reference to FIG. 1, the end portion of the second electrode 120 on the first position P1 side is located closer to the first position P1 than the end portion of the first electrode 110 on the first position P1 side. Thus, when the first tab 112 and the second tab 122 move toward the laminate 100 by swelling of the battery 10, a possibility of the second tab 122 coming into contact with the first electrode 110 may be smaller than a possibility of the first tab 112 coming into contact with the second electrode 120. Therefore, even though the member 300 does not cover the second tab 122 side of the laminate 100, it is possible to reduce the possibility of the second tab 122 coming into contact with the first electrode 110 to some extent.

Figure 4:
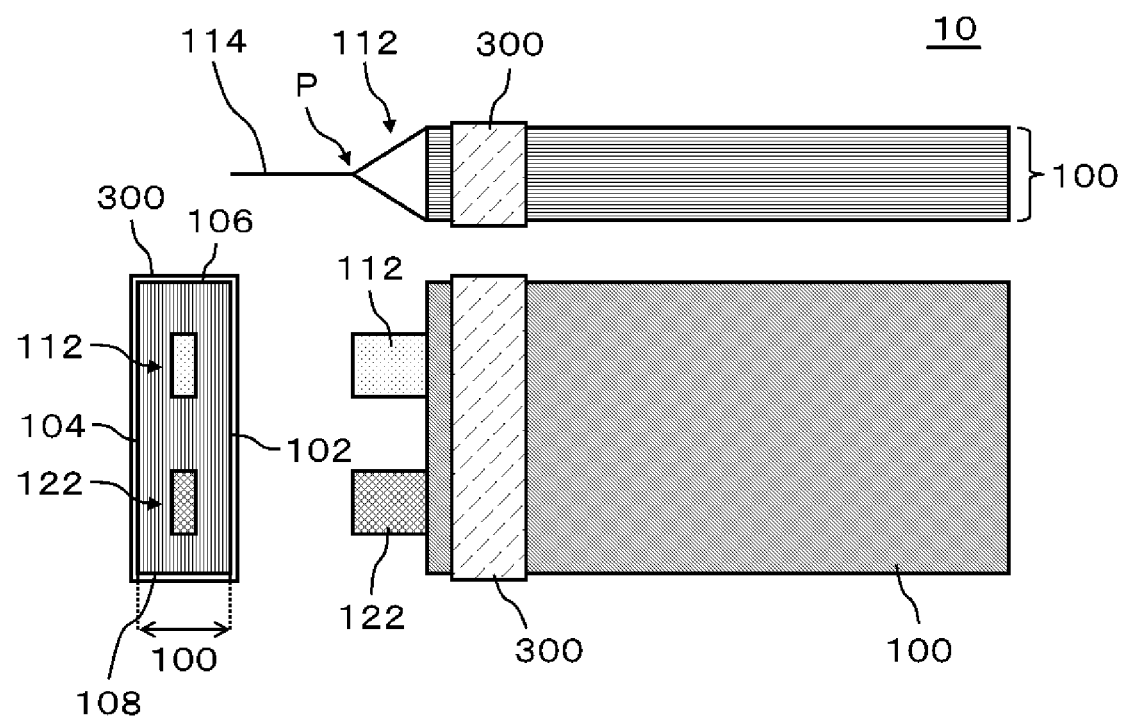
FIG. 4 is a diagram illustrating a second example of the method of restricting swelling of the laminate.

FIG. 4 is a diagram illustrating a second example of the method for restricting swelling of the laminate 100. The example illustrated in FIG. 4 is similar to the example illustrated in FIG. 3 except for the points as follows.

The member 300 covers the laminate 100 over the entire circumference including the first surface 102, the second surface 104, the third surface 106, and the fourth surface 108.

Since the member 300 covers the laminate 100 over the entire circumference, it is possible to restrict swelling of the laminate 100.

Figure 5:
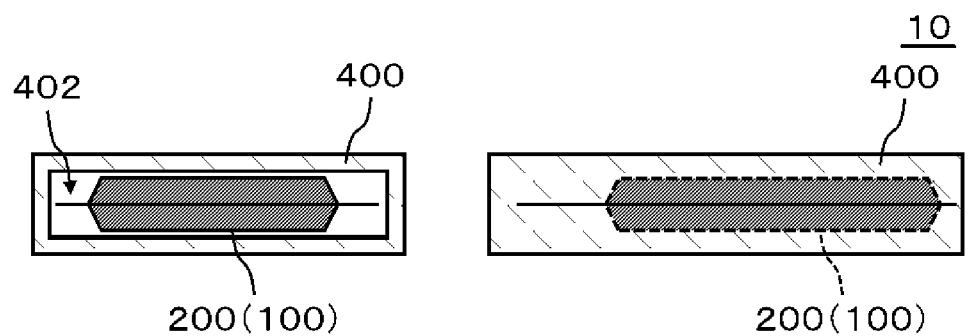
FIG. 5 is a diagram illustrating a third example of the method for restricting swelling of the laminate.

FIG. 5 is a diagram illustrating a third example of the method for restricting swelling of the laminate 100. The left figure in FIG. 5 is a front view of the battery 10, and the right figure in FIG. 5 is a side view of the battery 10.

The battery 10 includes an exterior material 200. The exterior material 200 accommodates the laminate 100 (for example, FIG. 3).

The battery 10 includes an accommodation member 400. The accommodation member 400 defines a space 402. The accommodation member 400 accommodates the exterior material 200 in the space 402.

The accommodation member 400 restricts the swelling of the laminate 100 (exterior material 200) in the thickness direction of the laminate 100 (exterior material 200). Specifically, the length of the space 402 in the thickness direction of the laminate 100 (the exterior material 200) is designed such that the thickness of the laminate 100 is suppressed to be within the above-described range even if the laminate 100 (exterior material 200) swells to the maximum in the space 402.

In the example illustrated in FIG. 5, the length of the space 402 in the thickness direction of the laminate 100 (the exterior material 200) is longer than the thickness of the exterior material 200 in a case where the laminate 100 does not swell. That is, the laminate 100 may slightly swell in the space 402. If the swelling of the laminate 100 is not allowed at all, when the laminate 100 intends to swell, a large force is applied to the laminate 100 and the accommodation member 400, and thus the laminate 100 (exterior material 200) or the accommodation member 400 may be damaged. In the example illustrated in FIG. 5, damage on the laminate 100 (the exterior material 200) or the accommodation member 400 is prevented by slightly allowing the swelling of the laminate 100.

Figure 6:
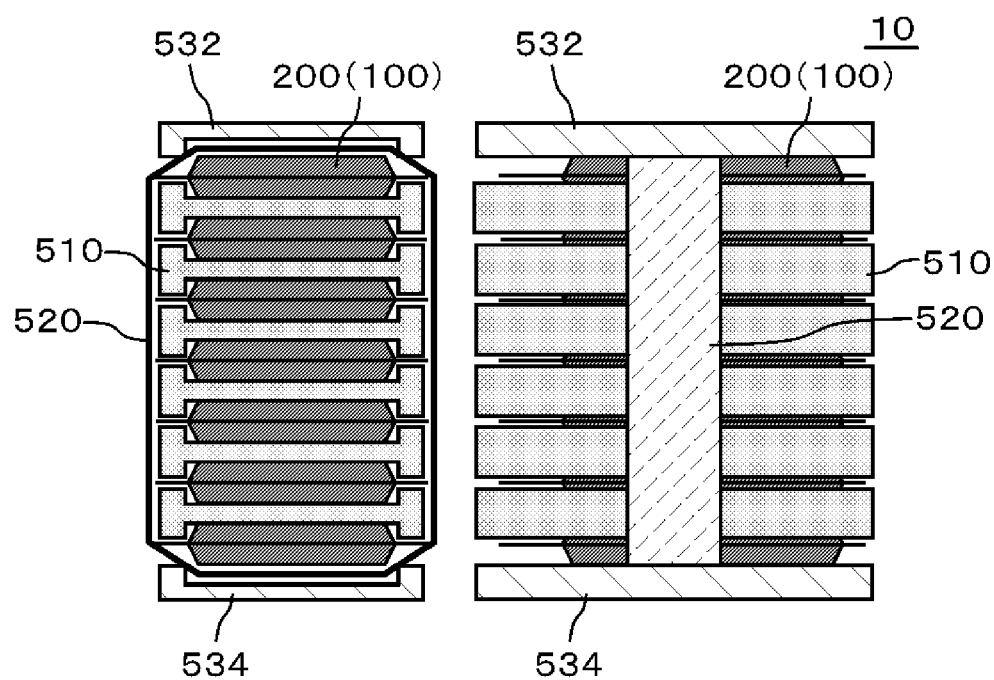
FIG. 6 is a diagram illustrating a fourth example of the method for restricting swelling of the laminate.

FIG. 6 is a diagram illustrating a fourth example of the method for restricting swelling of the laminate 100. The left figure in FIG. 5 is a front view of the battery 10, and the right figure in FIG. 5 is a side view of the battery 10.

The battery 10 includes a plurality of exterior materials 200, a plurality of spacers 510, a member 520, a cover 532, and a cover 534. The plurality of exterior materials 200 accommodate the plurality of laminates 100, respectively (for example, FIG. 3). The plurality of exterior materials 200 are stacked on each other. The plurality of spacers 510 separate the adjacent exterior materials 200 from each other. The member 520 integrally fixes the plurality of exterior materials 200 and the plurality of spacers 510. In the example illustrated in FIG. 6, the member 520 is a tape and is wound around the plurality of exterior materials 200 and the plurality of spacers 510. The cover 532 and the cover 534 are located on sides opposite to each other across the plurality of exterior materials 200 and the plurality of spacers 510 which have been integrally fixed by the member 520.

In the example illustrated in FIG. 6, it is possible to restrict swelling of the laminate 100 (the exterior material 200) by integrally fixing the plurality of exterior materials 200 with the member 520.

Figure 7:
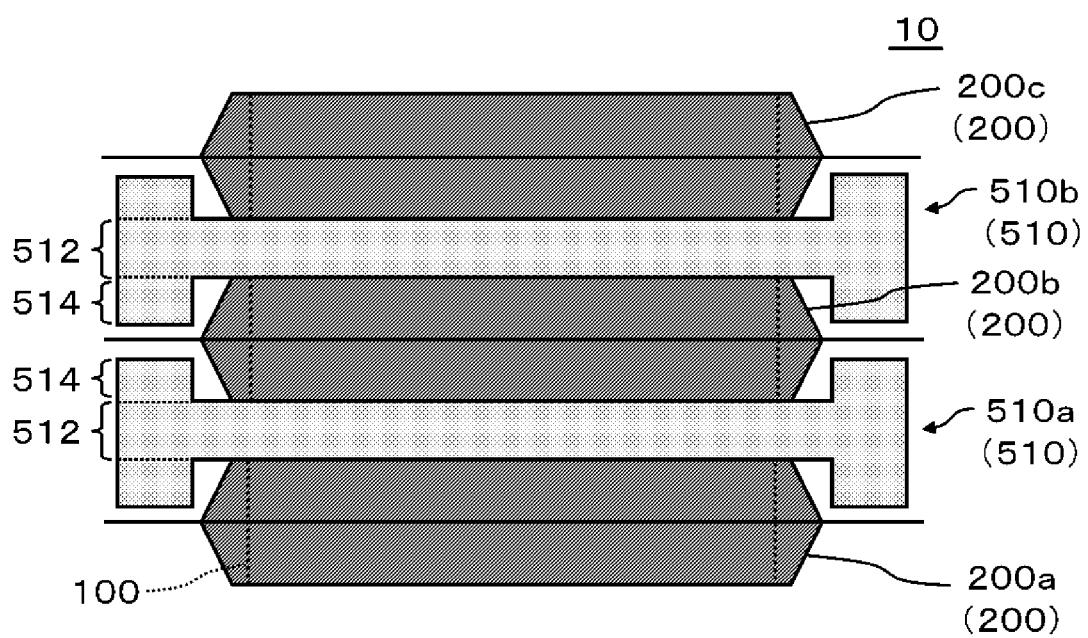
FIG. 7 is a diagram illustrating details of a battery 10 illustrated in FIG. 6.

FIG. 7 is a diagram illustrating details of the battery 10 illustrated in FIG. 6.

The plurality of exterior materials 200 include a first exterior material 200*a*, a second exterior material 200*b*, and a third exterior material 200*c*. The first exterior material 200*a*, the second exterior material 200*b*, and the third exterior material 200*c* are arranged in order.

The plurality of spacers 510 include a first spacer 510*a* and a second spacer 510*b*. The first spacer 510*a* separates the first exterior material 200*a* and the second exterior material 200*b* from each other. The second spacer 510*b* separates the second exterior material 200*b* and the third exterior material 200*c* from each other.

The first spacer 510*a* includes a first portion 512 and a second portion 514. The first portion 512 of the first spacer 510*a* overlaps the first exterior material 200*a* and the second exterior material 200*b*. The second portion 514 of the first spacer 510*a* protrudes toward the second spacer 510*b* from the first portion 512 of the first spacer 510*a*. In the example illustrated in FIG. 7, the first spacer 510*a* includes second portions 514 on both sides of the laminate 100.

The second spacer 510*b* includes a first portion 512 and a second portion 514. The first portion 512 of the second spacer 510*b* overlaps the second exterior material 200*b* and the third exterior material 200*c*. The second portion 514 of the second spacer 510*b* protrudes toward the first spacer 510*a* from the first portion 512 of the second spacer 510*b*. In the example illustrated in FIG. 7, the second spacer 510*b* includes second portions 514 on both sides of the laminate 100.

The second portion 514 of the first spacer 510*a* and the second portion 514 of the second spacer 510*b* face each other.

In the example illustrated in FIG. 7, it is possible to prevent crushing of the second exterior material 200*b* when the first exterior material 200*a* and the third exterior material 200*c* swell in a direction of stacking the plurality of exterior materials 200, and the second exterior material 200*b* does not swell. Specifically, in the above-described configuration, the second portion 514 of the first spacer 510*a* and the second portion 514 of the second spacer 510*b* face each other. Thus, even if the first exterior material 200*a* and the third exterior material 200*c* swell, the length of a gap between the first spacer 510*a* and the second spacer 510*b* does not become shorter than the constant length by contact between the second portion 514 of the first spacer 510*a* and the second portion 514 of the second spacer 510*b*. Therefore, it is possible to prevent crushing of the second exterior material 200*b*.

In the example illustrated in FIG. 7, in a case where the first exterior material 200*a* and the third exterior material 200*c* do not swell, the second portion 514 of the first spacer 510*a* and the second portion 514 of the second spacer 510*b* face each other across a gap. That is, the first exterior material 200*a* and the third exterior material 200*c* may be slightly swelled. If the swelling of the first exterior material 200*a* and the third exterior material 200*c* is not allowed at all, when the first exterior material 200*a* and the third exterior material 200*c* intend to swell, a large force is applied to the first exterior material 200*a* and the third exterior material 200*c*, and thus the first exterior material 200*a* and the third exterior material 200*c* may be damaged. In the example illustrated in FIG. 7, damage on the first exterior material 200*a* and the third exterior material 200*c* is prevented by slightly allowing the swelling of the first exterior material 200*a* and the third exterior material 200*c*.

In addition, in the example illustrated in FIG. 7, it is possible to perform positioning of the exterior material 200 by the second portion 514 of the spacer 510. Specifically, it is possible to prevent a shift of the second exterior material 200*b* to the left side in FIG. 7, by the second portion 514 of the first spacer 510*a* on the left side in FIG. 7 and the second portion 514 of the second spacer 510*b* on the left side in FIG. 7. In addition, it is possible to prevent a shift of the second exterior material 200*b* to the right side in FIG. 7, by the second portion 514 of the first spacer 510*a* on the right side in FIG. 7 and the second portion 514 of the second spacer 510*b* on the right side in FIG. 7. In this manner, it is possible to perform positioning of the exterior material 200 (second exterior material 200*b*).

Figure 8:
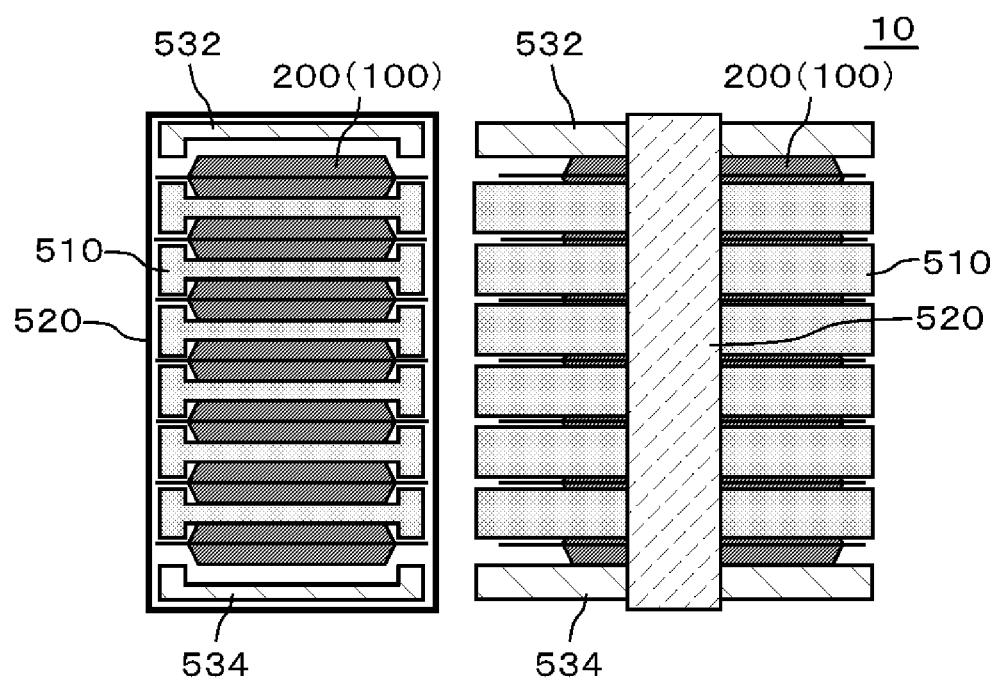
FIG. 8 is a diagram illustrating a fifth example of the method for restricting swelling of the laminate.

FIG. 8 is a diagram illustrating a fifth example of the method for restricting swelling of the laminate 100. The example illustrated in FIG. 8 is similar to the example illustrated in FIG. 6 except for the points as follows.

In the example illustrated in FIG. 8, the plurality of exterior materials 200 and the plurality of spacers 510 are located between the cover 532 and the cover 534. The member 520 integrally fixes the plurality of exterior materials 200, and the plurality of spacers 510 integrally fix the cover 532 and the cover 534.

Also in the example illustrated in FIG. 8, it is possible to restrict the swelling of the laminate 100 (the exterior material 200) by integrally fixing the plurality of exterior materials 200 with the member 520.

Hitherto, the embodiment of the present invention has been described with reference to the drawings, and various configurations other than the above description can be employed.

The invention claimed is:

1. A battery comprising:
a plurality of laminates, each of the plurality of laminates including a plurality of first electrodes, a plurality of second electrodes which have polarities different from the plurality of first electrodes and are alternately arranged with the plurality of first electrodes, and a plurality of separators that respectively separate the first electrodes and the second electrodes from each other;
a plurality of first tabs that respectively protrude from the plurality of first electrodes and are bundled together;
a first spacer that separates a first laminate and a second laminate of the plurality of laminates;
a second spacer that separates the second laminate and a third laminate of the plurality of laminates; and
a member that integrally fixes the plurality of laminates, the first spacer, and the second spacer,
wherein the plurality of first electrodes includes a primary first-electrode, a secondary first-electrode, and a tertiary first-electrode,
the primary first-electrode is located between the secondary first-electrode and the tertiary first-electrode,
the first tab for the primary first-electrode, the first tab for the secondary first-electrode, and the first tab for the tertiary first-electrode are connected to each other at a first position of an equal distance from the secondary first-electrode and the tertiary first-electrode,
the plurality of second electrodes includes a primary second-electrode adjacent to the primary first-electrode,
the plurality of separators includes a first separator that separates the primary first-electrode and the primary second-electrode from each other,
each of the plurality of laminates has a thickness $T_0$ from the secondary first-electrode to the tertiary first-electrode,
the first position is spaced from an end portion of the first separator on the first position side by a distance $L_0$ in a direction perpendicular to the thickness direction of each of the plurality of laminates,
the end portion of the first separator on the first position side protrudes toward the first position from an end portion of the primary second-electrode on the first position side, by a distance G in the direction perpendicular to the thickness direction of each of the plurality of laminates,
the first spacer includes a first portion overlapping the second laminate and a second portion protruding toward the second spacer from the first portion of the first spacer,
the second spacer includes a first portion overlapping the second laminate and a second portion protruding toward the first spacer from the first portion of the second spacer,
the second portion of the first spacer and the second portion of the second spacer face each other through a gap in a first state of the first laminate and the third laminate,
the member is configured to restrict swelling of the plurality of laminates to smaller than $2\times\{(T_0/2)^2+L_0^2-(L_0-G)^2\}^{1/2}$ from the secondary first-electrode to the tertiary first-electrode, and
the second portion of the first spacer and the second portion of the second spacer are in contact with each other in a second state of the first laminate and the third laminate, wherein at least one of the first laminate and the third laminate in the second state swells more than the at least one of the first laminate and the third laminate in the first state.

2. The battery according to claim 1,
wherein the first state of the first laminate and the third laminate is an initial state of the first laminate and the third laminate, and
wherein the second state of the first laminate and the third laminate is a state where the at least one of the first laminate and the third laminate has swelled.

3. The battery according to claim 1, wherein the member comprises a tape that is wound around and integrally fixes the plurality of laminates, the first spacer, and the second spacer.

4. A battery comprising:
a plurality of laminates, each including a plurality of first electrodes, a plurality of second electrodes, and a plurality of separators;
a plurality of exterior materials that respectively accommodate the plurality of the laminates and are stacked together;
a plurality of spacers that separate the adjacent exterior materials from each other; and
a member that integrally fixes the plurality of the laminates and the plurality of spacers,
wherein the plurality of exterior materials includes a first exterior material, a second exterior material, and a third exterior material in order,
the plurality of spacers includes a first spacer that separates the first exterior material and the second exterior material from each other and a second spacer that separates the second exterior material and the third exterior material from each other,
the first spacer includes a first portion overlapping the first exterior material and the second exterior material and a second portion protruding toward the second spacer from the first portion of the first spacer,
the second spacer includes a first portion overlapping the second exterior material and the third exterior material and a second portion protruding toward the first spacer from the first portion of the second spacer,
the second portion of the first spacer and the second portion of the second spacer face each other through a gap in a first state of the first exterior material and the third exterior material, and
the second portion of the first spacer and the second portion of the second spacer are in contact with each other in a second state of the first exterior material and the third exterior material, wherein at least one of the first exterior material and the third exterior material in the second state swells more than the at least one of the first exterior material and the third exterior material in the first state.

5. The battery according to claim 4,
wherein the first state of the first exterior material and the third exterior material is an initial state of the first exterior material and the third exterior material, and
wherein the second state of the first exterior material and the third exterior material is a state where the at least one of the first exterior material and the third exterior material has swelled.

\* \* \* \* \*